United States Patent [19]

Constant

[11] Patent Number: 4,737,930

[45] Date of Patent: Apr. 12, 1988

[54] TRANSMISSION LINE DIVIDERS AND MULTIPLIERS

[76] Inventor: James Constant, 1603 Danbury Dr., Claremont, Calif. 91711

[21] Appl. No.: 850,777

[22] Filed: Jun. 30, 1986

Related U.S. Application Data

[60] Division of Ser. No. 545,514, Oct. 26, 1983, Pat. No. 4,620,290, which is a continuation-in-part of Ser. No. 259,462, May 1, 1981, abandoned.

[51] Int. Cl.[4] .......................... G06G 7/16; G02F 1/29

[52] U.S. Cl. ...................................... 364/841; 364/845

[58] Field of Search ............... 364/726, 841, 826, 837, 364/822, 845, 604, 606, 728, 754, 761

[56] References Cited

U.S. PATENT DOCUMENTS

| | | | |
|---|---|---|---|
| 3,004,424 | 10/1961 | Yando | 364/841 X |
| 3,629,567 | 12/1971 | Buggemann | 364/841 |
| 4,139,897 | 2/1979 | Gardner et al. | 364/822 X |
| 4,187,000 | 2/1980 | Constant | 364/822 X |
| 4,198,634 | 4/1980 | Jernigan et al. | 324/77 K X |
| 4,204,262 | 5/1980 | Fitelson et al. | 364/822 |
| 4,225,938 | 9/1980 | Turpin | 364/822 |
| 4,275,454 | 6/1981 | Klooster, Jr. | 364/822 X |
| 4,282,510 | 8/1981 | Southgate | 350/162.12 X |
| 4,282,511 | 8/1981 | Southgate et al. | 358/106 X |
| 4,282,579 | 8/1981 | Speiser et al. | 364/726 |
| 4,332,134 | 3/1982 | Turpin | 350/361 |
| 4,389,092 | 6/1983 | Tamura | 364/822 X |
| 4,389,093 | 6/1983 | Jackson | 364/822 X |
| 4,620,290 | 10/1986 | Constant | 364/822 X |

OTHER PUBLICATIONS

Acousto-Optic Signal Processing: Convolution And Correlation; W. T. Rhodes, Proceedings of the IEEE, vol. 69, No. 1, Jan. 1981, pp. 65–79.

*Primary Examiner*—Jerry Smith
*Assistant Examiner*—Charles B. Meyer

[57] ABSTRACT

A transmission line is used to implement a divider or multiplier. Transmission lines are used to implement coefficient multipliers in Fourier transformers and Convolvers.

13 Claims, 1 Drawing Sheet

TRANSMISSION LINE DIVIDERS AND MULTIPLIERS

CROSS-REFERENCE TO RELATED APPLICATION

This application is a division of my copending application Ser. No. 545,514, filed Oct. 26, 1983, now U.S. Pat. No. 4,620,290, which was a continuation-in-part of my copending application Ser. No. 259,462 filed May 1, 1981 based in turn on my Disclosure Document No. 081,251 filed June 4, 1979.

BACKGROUND OF THE INVENTION

The present invention relates to dividers, multipliers, Fourier Transformers and Convolvers and more particularly to the processing of electronic signals, for example analog and digital signals found in a computer. The Fourier transform (FT) and convolution (C) can now be computed optically or electronically. In optical processing, a first lens is used to obtain the FT and a second lens is used to obtain the C. This call all be seen in the Special Issue on Optical Computing of IEEE Proceedings January 1977 and particularly in the article therein by J. Goodman. In electronic processing, a Fourier or Fast Fourier transformer may be used to obtain the FT and a convolver, matched filter or correlator can be used to obtain the C. Fourier transformers and convolvers (which include matched filters and correlators) can be implemented as analog or digital devices, such as surface acoustic wave (SAW), charge coupled devices (CCD), shift registers (SR), random access memory (RAM), etc. This can all be seen in the Special Issue on Surface acoustic Wave Devices of IEEE Proceedings May 1976 and particularly in the articles therein by J. Maines and E. Paige and G. Kino, and in the book by L. Rabiner and B. Gold "Theory and Application of Digital Signal Processing" Prentice-Hall 1975.

In optical processing, each element of a transparency at the input or front focal plane of a first lens illuminates the lens along different length paths and the lens illuminates the output or back focal plane of the lens. Each element of the backplane of the lens receives a single ray of light from each element of the frontplane of the lens. It is the combination of illuminations from all elements of the input transparency in each element of the backplane of the lens that produces the FT in the backplane of the lens and thereby forming an optical Fourier transformer. In a similar manner, a first and second lens in series, with a front, middle and back focal planes and with transparencies in the front and middle planes, produces the C in the backplane of the second lens and thereby forming (one version of) an optical convolver. In other words, light rays can be spatially traced through optical lens systems to obtain the FT and C.

Electronic processors are based on general purpose (gp) and special purpose (sp) computers. Briefly gp computers implement the FT and C by writing algorithms in a software program while sp computers encode or build algorithms into the hardware. There is no tracing of spatial paths in gp electronic processors. In sp electronic processing, each element of a delay line at the input sends a signal along a different path to an adder at the output. Coefficient multipliers are used to multiply signals in each path and these are bulky, power consuming and slow acting devices. Often, multipliers are the most critical units of the processor. However, sp electronic processors are analogs of the optical lens in the sense that signals can be traced along different paths (including coefficient multipliers). For example, see FIG. 6.16 in the book by Rabiner and Gold.

However, there is no basic reason the spatial tracing of paths, inherent to the optical systems, cannot be implemented electronically without conventional multipliers and thereby to provide new and useful computational elements such as dividers, multipliers, Fourier transformers and convolvers. The ability to operate efficiently on 2-D data and to perform operations such as the FT and C are several advantages of the optical systems compared to the electronic ones. However, the outstanding feature of optical systems is the speed with which these parallel operations can be carried out. The outstanding deficiency of the optical systems is the inefficiency of spatial light modulators and demodulators (transducers) for coupling and decoupling electronic signals to light paths and this single area is presently limiting the lens based optical processor.

It is the purpose of the present invention to produce dividers, multipliers, sp electronic lenses, Fourier transformers and convolvers having the 2-D (two-dimensionality) and speed advantages of optical lens processors but without the disadvantage of coupling and decoupling electronic signals to optical lens paths and thereby capable of exceeding the practical capacity, speed and ease of access of present electronic systems by at least several orders of magnitude, at reduced size and cost.

SUMMARY OF THE INVENTION

The invention provides method and apparatus for the implementation of electronic dividers, multipliers, electronic lenses, Fourier transformers and convolvers. Each element of the input of such devices is connected to each element of the output by a transmission line. The transmission line parameters of characteristic impedance, load impedance, propagation constant and length of line are selected to obtain the desired divisor or multiplier of the input signal.

The general purpose of the invention is to provide small-size, low-cost dividers and multipliers for the implementation of high-capacity high-speed electronic lenses, Fourier transformers and convolvers. Utilizing the system of the present invention the analog and digital processing of signals in sp computers may be accomplished efficiently and economically in real time.

An object of the invention is to provide a number of configurations of the invention and thereby to provide new and improved sp computers.

DESCRIPTION OF THE PREFERRED EMBODIMENTS

Figure 1:
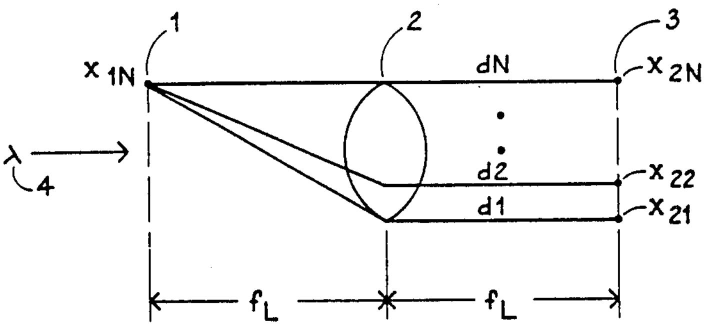
FIG. 1 is a prior art FT system.

Referring to FIG. 1, is shown a prior art optical FT system. If an input transparency with amplitude transmittance $f(x_1, y_1)$, placed at the front focal plane 1 of a spherical focal lens 2 (of focal length $f_L$), is illuminated with coherent laser light (of wavelength $\lambda$), then the light amplitude distribution in the back focal plane 3 of lens 2 is the complex 2-D optical spatial FT of $f(x_1, y_1)$ $$F(u,v) = \frac{1}{\lambda f_L} \iint_{-\infty}^{+\infty} f(x_1, y_1)\exp(-j2\pi(ux_1 + vy_1))\, dx_1 dy_1 \quad (1)$$

where lower case variables f denote space functions and upper case variables F denote their FTs. Distances in the input plane 1 are denoted by $(x_1, y_1)$ where $x_1$ is in the plane of the paper (as shown) and $y_1$ is perpendicular to the plane of the paper (not shown). The spatial distances $(x_2, y_2)$ in the FT plane 3 are related to spatial frequencies (u, v) by $$u = \frac{x_2}{\lambda f_L}\ v = \frac{y_2}{\lambda f_L} \quad (2)$$

where units of x and y are typically in meters and units of u and v are cycles per meter (analogous to Hertz in the conventional temporal FT). In FIG. 1 each element at location $x_1$, $y_1$ of the input focal plane 1 illuminates the lens 2 and backplane 3 via delay paths d. Shown in the figure are delay paths d1, d2, . . . , dN corresponding to element $x_{1N}$. Similar delay paths (not shown) exist for the remaining elements $x_{11}, x_{12}, \ldots, x_{1N-1}$.

Figure 2:
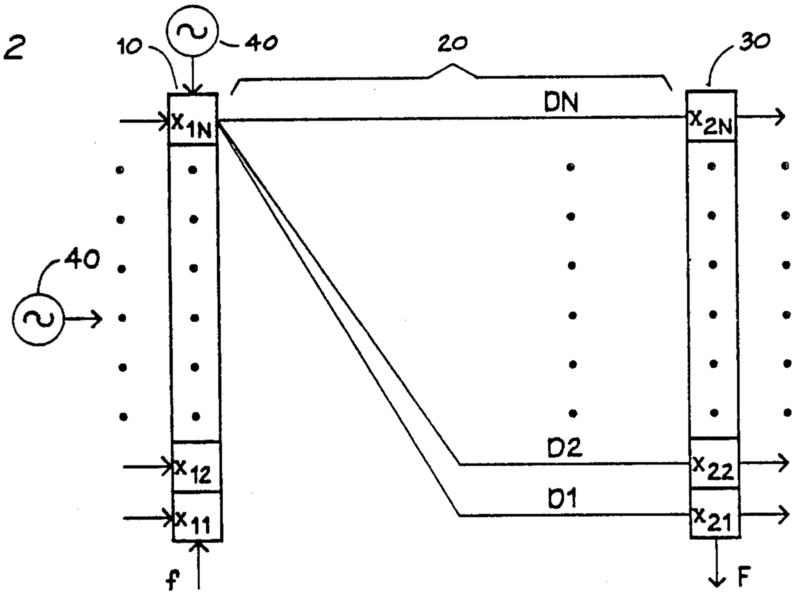
FIG. 2 is a FT or C system according to the invention.

Referring to FIG. 2, is shown an electronic FT system according to the invention. A first means 10 is used for storing samples or words of electrical signal f at locations $x_{11}, x_{12}, \ldots, x_{1N}$. A second means 30 is used for storing samples or words of electronic signal F at locations $x_{21}, x_{22}, \ldots, x_{2N}$. A third means 20 is used for connecting elements $x_{11}, x_{12}, \ldots, x_{1N}$ in means 10 with elements $x_{21}, x_{22}, \ldots, x_{2N}$ in means 30. Shown in the figure are delay paths D1, D2, . . . , DN corresponding to element $x_{1N}$. Similar delay paths (not shown) exist for the remaining elements $x_{11}, x_{12}, \ldots, x_{1N}$.

To obtain the necessary delay and phase required by equation (1), each path D1, D2, . . . , DN in means 20 is implemented as a transmission line. It will therefore be obvious to those in the art to connect paths D1, D2, . . . , DN having proper delay and phase in means 20 to form the FIG. 2 electronic analog of the FIG. 1 optical lens. Thus, FIG. 2 is the electronic lens and Fourier transformer analog of the optical lens and Fourier transformer of FIG. 1; both compute the 2-D Fourier transform (1) or the 1-D Fourier transform (if y=0 in (1)). However, unlike the optical Fourier transformer of FIG. 1 which obtains the intensity distribution $|F|^2$, the invention Fourier transformer of FIG. 2 may also record the FT directly by implementing elements $x_{2N}$ in means 30 for vector adding of signals. In the system of FIG. 2, the diffraction lens 2 of FIG. 1 is simulated by transmission lines DN.

Except for constants of proportion, the value of F at a given element $x_{2m}$ of means 30 is $$F(u_{2m}) = \sum_{n=1}^{N} f(x_{1n})\exp(-j2\pi u_{2m}x_{1n}),\ m = 1, 2, \ldots, N \quad (3)$$

which is a digital form of equation (1) (a convolution). In equation (3), the filter multipliers are provided by the exponential terms $\exp(-j2\pi u_{2m}x_{1n})$. It will be appreciated that while exponential multipliers are used in equation (3), by way of example, any function g can be used in equation (3) replacing exponential multipliers $\exp(-j2\pi u_{2m}x_{1n})$.

Consider now the path Dm from element $x_{1n}$ in means 10 to element $x_{2m}$ in means 30. This transmission line receives as input signal $f(x_{1n})$ (a portion of signal f stored at location $x_{1n}$) and provides output the signal $f(x_{1n})\exp(-j2\pi u_{2m}x_{1n})$ (a portion of signal F stored in location $x_{2m}$). The input signal $f(x_{1n})$ propagates in path Dm at a speed which is determined by the dielectric constant of the pathmedium, for example a fiber optic path Dm in optical transmission, or is determined by the dielectric constant of an insulator medium which surrounds the path, for example a metal wire path Dm in electrical transmission. If the medium is air (or a vacuum), the relative dielectric constant is 1 and the signal travels with the speed of light which in units appropriate to this discussion is about 30 centimeters per nanosecond. In other insulators the dielectric constant is larger and the speed is reduced by a factor proportional to the square root of the dielectric constant. For a fiberglass printed-circuit board means 20 the dielectric constant is approximately 4, and so the propagation speed is reduced by a factor 2, i.e., signals travel through conductors DN at about 15 centimeters per nanosecond.

Minimizing path lengths and maximizing the density of paths DN in means 20 is a matter of importance in obtaining high-speed performance of a FIG. 2 system in a small size package. For example, a signal may have to go appreciably farther than 15 centimeters to get from means 10 to means 30. In slower digital devices 10 and 30 a delay of this magnitude is insignificant because the switching delays of logic gates in means 10 and 30 are tens or hundreds of nanoseconds. However, if means 10 and 30 are built out of devices that switch in a nanosecond, propagation delays in means 20 clearly will have a major influence in the overall speed of operations. Since paths DN are transmission lines with lengths prescribed by equation (3) there is a maximum speed limit of operation.

The signal in a transmission line path DN is represented as a propagating wave and the voltage and current at any point along the path depends on both the length of the path and transmission line characteristics such as the electrical resistance. However, the electrical resistance is not the only property that affects the propagation of a signal. It is also important to know the inductance, which determines the amount of energy stored in the magnetic field set up by a passing current, and the capacitance, which determines the energy stored in the corresponding electric field. The inductance and the capacitance depend on the geometry of the transmission line and on electrical and magnetic properties of the materials it is made from. For a low-resistence transmission line the impedance is equal to the square root of the ratio of the inductance per unit length to the capacitance per unit length. It is measured in ohms, the same unit employed for resistence, but its effects on a propagating signal are more complicated than the effect of resistence on a steady current.

One characteristic of all waves is that they can be reflected. Similarly, a digital signal can be partially reflected from a discontinuity in the transmission line or from the end of the line. The reflection coefficient, which gives the fraction of the signal reflected, is determined by the impedance and by the load resistance that terminates the line. Thus, if a given transmission line has an impedance of 100 ohms and the load resistance is also 100 ohms, the signal is totally absorbed by the load and none of it is reflected back into the line; this is the ideal situation. If the load resistance is 200 ohms, however, a third of the signal is reflected and adds to the initial signal on the line. A load resistance of 50 ohms also yields a reflection coefficient of one-third, but the reflected signal is subtracted from the initial one. The basic theory and design of transmission lines is well established and can be seen in a number of references including the book by F. Terman, "Radio Engineer's Handbook", McGraw-Hill Book Co., 1943, particularly at pages 172–196.

Reflections are only one of several ways the electrical design of a FIG. 2 system can modify signals or introduce "noise". For example, two adjacent conductors DN can be coupled through their mutual inductance and capacitance, so that a signal sent down one line may also appear on the other. Such "crosstalk" must be avoided if the behavior of the system is to be predictable.

In a high performance FIG. 2 system, the basic method of controlling the characteristics of transmission lines DN is to separate layers of signal wires with conductive sheets called voltage reference planes (not shown). The reference planes can also provide a path for return currents. Each plane is at a uniform electric potential, either zero volts (ground voltage) or one of the supply voltages needed by chip means 10 and 30. Hence, the planes can also be used to distribute power. A signal line DN is encased in an insulating medium and sandwiched between two such planes and thereby makes a transmission line whose properties can be calculated. The planes give the line a uniform and well-defined impedance and also inhibit crosstalk between lines in adjacent layers. In FIG. 2, lines DN from a single element $x_{1n}$ in shift register means 10 are sandwiched between such voltage reference planes, for each n=1, 2, . . . N. A single element $x_{1m}$ in CCD or adder array means 30 is connected to each element $x_{1n}$ of means 10 using a conductor from each of the N sandwiched sets (N paths per set) of paths (not shown in FIG. 2).

The design of a transmission line Dm begins with the specification of its direct current resistance. The resistance must be small compared with the load resistance or the input voltage $f(x_{1n})$ will be seriously attenuated when it reaches the output of the line, at means 30. The resistance per unit length is determined by the resistivity of the insulating material which surrounds the conductor and the cross section of the conductor; once the insulating material is chosen only the latter property can be altered by the designer. For printed circuits, semiconductors and conductive traces fabricated by similar techniques, the cross section of a conductor DN is a flattened rectangle.

Given the dimensions of the conductor Dm, the line impedance is determined by two additional factors: the dielectric constant of the insulating medium in which conductors DN are buried and the distance between the voltage-reference planes. For a particular insulating material the distance between reference planes is adjusted to achieve the desired impedance. The design value depends on many factors, including the electrical properties, dimensions and other specifications of the total package of a FIG. 2 system and the amount of power available to drive transmission lines DN. Typically the impedance of a transmission line DN is in the range from 50 to 100 ohms.

As described, a conductor DN sandwiched between two voltage reference planes can only approximate an actual transmission line. In practice a signal path DN connecting means 10 and 30 may follow a tortuous route threading from one layer of wiring to another. At transitions such as those between sandwiched layers, the electrical properties depart significantly from the ideal. As noted previously, such discontinuities can cause reflections. They also introduce additional delays, proportional to their capacitance and inductance. The extra delays must be added to the basic propagation delay of the path to determine the total path delay.

From the foregoing it will be appreciated that while means 10 was disclosed as a shift register chip and means 30 was disclosed as a CCD chip or as an array of adders and means 20 was disclosed as N sandwiched sets of paths DN, the entire system of FIG. 2 can be implemented as a single monolithic chip circuit i.e., as a single silicon chip. In this case, the fabrication technology of silicon chips is available to produce the invention in large quantities.

As discussed at pages 178–184 of the cited Terman reference, a transmission line having input signal $E_s$ will provide an output signal $$E_r = \frac{E_s}{\frac{1}{2}\left(1 + \frac{Z_o}{Z_L}\right)\exp(\sqrt{ZY}\ l) + \frac{1}{2}\left(1 - \frac{Z_o}{Z_L}\right)\exp(-\sqrt{ZY}\ l)} \quad (4)$$

where $Z_o$=characteristic impedance $Z_L$=load impedance

ZY=propagation constant (Z=impedance, Y=admittance)

l=length of line (from receiver)

Equation (4) produces the invention divider or multiplier. To illustrate the procedure, equation (4) is simplified by assuming $Z_L=Z_o$ and $$\sqrt{ZY} = j\frac{2\pi}{\lambda t}$$

where $\lambda_t$ is the transmission line wavelength. In other words, it is assumed that the load impedance equals the line impedance and the transmission line is lossless. Equation (4) reduces to $$E_r = \frac{E_s}{\exp\left(j2\pi\frac{1}{\lambda t}\right)} \quad (5)$$

which not only represents a great simplification but is an important case as well.

A divider is obtained by setting $E_r$=F, $E_s$=f and $$\exp\left(j2\pi\frac{1}{\lambda t}\right) = g$$

where g is the desired divisor. The result is F=f/g, a division of input signal f by g. A multiplier is obtained by setting $E_r$=F, $E_s$=f and $$\exp\left(j2\pi\frac{1}{\lambda t}\right)=g^{-1}$$

where g is the desired multiplier. The result is F=fg, a multiplication of input signal f by g. In either case, a known function g results in a known value of line length l obtained by solving $$\exp\left(j2\pi\frac{1}{\lambda t}\right)=g\ or\ g^{-1}$$

as the case may be. Of course, g itself may be an exponential function, for example $g=\exp(-j2\pi u_{2m}x_{1n})$ of equation (3) in which case $$\frac{l_{mn}}{\lambda_t}=n\pm u_{2m}x_{1n}, \quad (6)$$

$'n=0, 1, 2, \ldots$ and the shortest length of time is therefore $l_{mn}=u_{2m}x_{1n}\lambda_t$, in which the spatial frequency $u_{2m}$ is related to distance $x_{2m}$ by the first of equations (2). Therefore, the length of transmission paths DN is given by the matrix $$l_{mn}=\frac{x_{2m}x_{1n}}{\lambda f_L}\lambda_t \quad (7)$$

in which all distances are in the same units. In FIG. 2 the distance between means 10 and means 30 is $2f_L$. In a first approximation of a lens, $f_L=D^2/\lambda$ so that equation (7) becomes $$l_{mn}=\frac{x_{2m}x_{1n}}{D^2}\lambda_t \quad (8)$$

in which $x_{2m}x_{1n}/D^2$ is equal to or less than unity and, therefore, the longest path DN is no longer than the wavelength $\lambda_t$. For example, if the propagation speed is 15 cm/nanosecond, the longest path is given by $$l_{mn}=\frac{15}{f_{GHz}}\text{ cm} \quad (9)$$

in which the frequency $f_{GHz}$ is given in GH units. Thus, if the frequency of signal $f(x_{1n})$ is 1 GHz the longest length of path is 15 cm and so forth. In general, path lengths DN are frequency dependent and these can be reduced by decreasing the propagation speed and by increasing the frequency of waves. It will be appreciated by those in the art that the path length indicated by equation (9) can be cut in half by selecting the center of coordinates at the midpoint of means 10 instead of at the beginning. It will also be appreciated that while equations (5)-(9) have been provided for the important case of a matched lossless transmission, any other load impedance and loss in transmission may be used with comparable results.

Up to this point I have disclosed electromagnetic waves propagating in paths DN. However, sound waves are not precluded. For example, electrical signals at locations $x_{1n}$ in shift register means 10 can be launched into a surface acoustic wave (SAW) device means 20 and recovered at locations $x_{2m}$ in CCD or AND gate array means 30. The coupling and decoupling of electromagnetic waves in a SAW device is well known, as exemplified in U.S. Pat. No. 4,035,775 to Schultz et al for a Temperature Compensated Acoustic SAW. For such acoustic paths DN with a speed of sound at about $10^{-5}$ the speed of light, the equation comparable to equation (9) is given by $$l_{MN}=\frac{0.3}{f_{MHz}}\text{ cm} \quad (10)$$

in which the frequency $f_{MHz}$ is in MHz units. Thus, if the frequency of the signal $f(x_{1n})$ is 1 MHz the longest length of path is 0.3 cm and so forth.

In view of equation (6), path lengths can be incremented by one or more full wavelengths $\lambda_t$ without changing results. In practice, this lengthening of paths may be used to facilitate the actual design but is done at the expense of decreasing the processing speed.

Whether paths DN in means 20 are electromagnetic or sound paths, they can always be implemented as individual paths separate one from another. As suggested previously for electromagnetic paths DN, it is desired to package a compact means 20 using semiconcutor fabrication techniques, for example, by having the set of discrete conductors inscribed in a single monolithic wafer, printed circuit board, substrate or insulating medium sandwiched between voltage reference planes with N layers each layer containing the set of paths DN corresponding to element $x_{1n}$. This same technique can be followed for packaging sound paths DN, namely, by having a set of discrete paths DN in a monolithic SAW sandwiched between voltage reference planes with N SAW layers each layer containing the set of paths corresponding to element $x_{1n}$. In either case, elements $x_{2m}$ in CCD or logic ADD gate array means 30 are connected to each element $x_{1n}$ in means 10 using a conductor from each of the sandwiched layers.

Nor are microwaves precluded in paths DN. For example, electrical signals at locations $x_{1n}$ in shift register means 10 can be launched into microwave paths DN in means 20 and recovered at locations $x_{2m}$ in CCD or logic ADD gate array means 30. The coupling and decoupling of electrical signals in microwave guides is well known. Nor are light waves precluded in paths DN. For example, electrical signals at locations $x_{1n}$ in shift register means 10 can be launched into fiber optic paths DN in means 20 and recovered at locations $x_{2m}$ in CCD or logic ADD gate array means 30. The coupling and decoupling of electrical signals in optical fibers is well known, as exemplified by U.S. Pat. No. 4,274,104 to Fang for Electro-Optical IC Communications.

Nor is it necessary to have means 10 as a shift register and means 30 as a CCD or as an array of ADD logic gates. Thus, with sound paths DN, means 10 may be a SAW device with N outputs or taps corresponding to elements $x_{1n}$ and means 30 may be a SAW device with N inputs or taps to each element $x_{2m}$. In this case, the required addition in equation (3) is accomplished by adding the phases of all waves appearing at element $x_{2m}$. Or, with optical fiber paths DN, means 10 may be an optical fiber with N outputs or taps corresponding to elements $x_{1n}$ and means 30 may be an integrating detector, as exemplified in U.S. Pat. No. 4,225,938 to Turpin for a Time-Integrating Acousto-Optical Processors. In this case, the required addition in equation (3) is accomplished by adding the phases of all waves appearing at element $x_{2m}$.

The use of shift registers in a filter is shown in U.S. Pat. No. 3,831,013 to Alsup for Correlators Using Shift Registers. The use of CCDs in imagers and filters is shown in U.S. Pat. No. 3,859,518 to Sander for CCD Light Change Monitor for Sensing Movement, in U.S. Pat. No. 3,937,942 to Bromley et al for a Multichannel Optical Correlator System, in U.S. Pat. No. 3,942,109 to Crumley et al for a Sweeping Spectrum Analyzer, in U.S. Pat. No. 4,045,795 to Arens for a CCD Data Processor for an Airborne Imaging Radar System, in U.S. Pat. No. 4,064,533 to Lampe et al for a CCD Focal Plane Processor for Moving Target Imaging, in U.S. Pat. No. 4,097,749 to Gardner for Fourier Power Spectra of Optical Images Using CCDs, in U.S. Pat. No. 4,132,989 for Real-Time SAR Image Processing, and in U.S. Pat. No. 4,209,853 to Hyatt for a Holographic System for Object Location and Identification. The Hyatt patent also describes an array of acoustic trandcer elements 910 used for converting sound waves to electrical signals. Any one of the devices above can be used to implement means 10 or 30 in FIG. 2.

Up to this point I have disclosed electrical signals entering means 10 and leaving means 30. However, sound waves are not precluded. For example, sound signals may be received at locations $x_{1n}$ in means 10 and these can be readily converted into electrical signals, as exemplified in the Hyatt patent. And, electrical signals at locations $x_{2m}$ in means 30 can be readily converted to sound waves. Thus, means 10 and means 30 may take the form of transducers for converting sound signals to electrical signals. Nor are electromagnetic waves precluded from entering means 10 and leaving means 30. For example, electromagnetic signals may be received at locations $x_{1n}$ in means 10 and these can be readily converted into electrical signals. And, electrical signals at locations $x_{2m}$ in means 30 can be readily converted to sound waves. Thus, means 10 and means 30 may take the form of array antennas for converting electromagnetic signals to electrical signals. Nor are light signals precluded from entering means 10 and leaving means 30. For example, light signals at locations $x_{1n}$ of means 10 can be converted to electrical signals, by heterodyning or by using photodetectors. And, electrical signals at locations $x_{2m}$ in means 30 can be converted to light signals, by heterodyning or by using LEDs (light emitting devices).

From the foregoing, it will be obvious to select means 10 and 30 and to specify paths DN in means 20 having known transmission line length and other characteristics to produce output signal $f(x_{1n})\exp(-j2\pi u_{2m}x_{1n})$ in means 30 for input signal $f(x_{1n})$ in means 10. In FIG. 2, paths DN are the analogs and simulate paths dN in FIG. 1; the difference between paths DN and dN being non-diffracting transmission (FIG. 2) vs diffracting spatial (FIG. 1) paths.

In the prior art of the Rabiner and Gold book, FIG. 6.16 shows a digital or analog system with first means for storing signal f (delay elements z), second means for storing signal F (adder +), and third means for connecting the first and second means using multiplying paths (coefficient multipliers $z_1$). In the prior art, the output signal F of a given path is obtained by multiplying input signal f with a filter coefficient, i.e., using a digital or analog multiplier. In the system of FIG. 2, the output signal F of a given path DN is obtained by passing input signal f through a transmission line whose length is dimensioned to produce the same result. Thus, the system of FIG. 2 can replace any digital or analog filter of the prior art simply by replacing multipliers by transmisson lines. And, the system of FIG. 2 can replace any optical filter (FIG. 1) simply by replacing diffracting paths dN by transmission lines DN.

As is known in the computing and signal processing arts, a convolver is a filter or computer which computes equations of the type (1) and (3) where the exponential $\exp(-j2\pi u_{2m}x_{1n})$ is replaced by a more general function g somtimes called the filter response. When function g resembles signal f the convolver becomes a correlator. In such devices g may appear either as a divisor or multiplier of signal f. The present invention provides a more efficient way of implementing the convolver by using transmission line paths DN, where $$g = \exp\left(j2\pi\frac{1}{\lambda t}\right) \text{ or } g^{-1} = \exp\left(j2\pi\frac{1}{\lambda t}\right).$$

Means 10, 20, 30 may be acoustical, electrical, electromagnetic analog and digital means and are the invention counterparts of means 1, 2, 3 of FIG. 1. For example, means 10, 30 might be shift registers (SRs) or charge coupled devices (CCDs) and delay paths DN might be electrical connectors (as shown). Or, means 10, 30 might be switching arrays for connecting a source 40 to means 20 which might be acoustical or electromagnetic delay paths DN. Or, means 10, 30 might be cathode ray tube (CRT) faces with source 40 beam scanning the individual locations $x_{1N}$ and $x_{2N}$ and delay paths DN might be photon or electron paths. Or, means 10, 30 might be photoelements and photodetectors and means 20 might be optical fibers DN. More generally, elements $x_{1N}$ are transmitters and elements $x_{2N}$ are receivers where signal f energizes transmitters $x_{1N}$ and signal F is obtained from receivers $x_{2N}$. The signal f may be applied directly to delay paths DN (as shown) or may be used to modulate transmitters $x_{1N}$, for example signal f may be used indirectly to control the passiang of signals from source 40 to delay paths DN. And, the signal F may be obtained directly from delay paths DN (as shown) or may be obtained indirectly as a result of demodulating receivers $x_{2N}$.

Thus, each element $x_{1n}$ in means 10 may be a transmitter connected to a source 40 and modulated by signal f to produce a high frequency modulated carrier signal in transmission line paths DN. Or, each element $x_{1n}$ in means 10 may include a transducer for converting sound or electromagnetic waves to electrical, acoustic, or electromagnetic signals for use in transmission line paths DN. And, each element $x_{2m}$ in means 30 may be a receiver to recover the modulation of signals in transmission line paths DN. Or, each element $x_{2m}$ in means 30 may include a transducer for converting signals from transmission line paths DN to electrical, acoustic or electromagnetic signals.

Storage means 10, 30 may be 1-D or 2-D arrays of elements. They may be serial or parallel input and serial or parallel output devices. Thus, while FIG. 2 shows means 10 having serial input, a plurality of N inputs may be applied in parallel one input to each element of means 10. And, while FIG. 2 shows means 10 having N parallel outputs, a single output of multiplexed elements may be used. Similarly is the case for means 30. Thus, means 10, 30 may be serial-in parallel-out, serial-in serial-multiplex-out, parallel-in parallel-out, parallel-in serial-multiplex-out, etc. While N elements are indicated for each means 10, 30 in FIG. 2 it will be understood that means 10 may have N elements and means 30 may have M elements.

Delay paths DN may be implemented as acoustic, electric, electromagnetic analog or digital paths provided only that each path has the proper delay and phase appropriate for the propagation of signals over that path. Accordingly, delay paths DN can be implemented as physically equal paths each having a different propagation speed or these can be implemented as physically unequal paths having the same propagation speed. Paths DN may operate in parallel (as shown) or these may be time multiplexed. The multiplexer (not shown) may be mechanical or electronic and may be included in means 10, 20, 30. Paths DN from a single element $x_{1N}$ in means 10 may be the N discrete paths (as shown) or these may form a single beam, with similar sets of paths or single beams corresponding to the remaining elements $x_{1N}$. Whether the paths DN are discrete or form a beam, they are distinguished from paths dN as being non-diffracting instead of diffracting paths.

A means 20 might be implemented as a plurality of N connections each connecting one element of means 10 with N elements of means 30. Another implementation might require a single connection connecting one element of means 10 with N elements of means 30 and with a multiplexer for serially multiplexing connections of all elements of means 10. The multiplexer may be mechanical (a switch) or electronic (a control signal) and may be included in means 10, 20, 30. Whether for multiplexing delay paths DN or elements $x_{1N}$, the use of a multiplexer may require the simultaneous use of means (not shown) for changing the sign, amplitude, delay and phase of paths DN.

A means 20 might be made as a plurality of thin semiconductor wafers forming a multilayered device, with each semiconductor corresponding to an element $x_{1N}$ of means 10. Each semiconductor has an inscribed pattern of delay paths DN each delay path including components for controlling the sign, amplitude, delay and phase of signals. The making of such patterns follows well known teachings of the semiconductor art for making integrated circuits. The common starting or driving point of paths DN of each semiconductor is connected to an element $x_{1N}$ in means 10 while the end or fanout points of paths DN are connected to elements $x_{2N}$ in means 30. The signals in paths DN may be direct or alternating current with or without amplitude, frequency and phase modulation and these may be inverted, amplified, attenuated, delayed, etc., as desired. Since the fanout from each element $x_{1N}$ in means 10 and fanin to each element $x_{2N}$ in means 30 is great, drivers or buffers may be included with elements $x_{1N}$ and $x_{2N}$ to drive and buffer delay paths DN.

Signals in means 10, 20, 30 may be acoustical, electrical, electromagnetic, analog or digital signals. For example, signal f might be the sampled or word output from an analog to digital converter. More generally, signals in means 10, 20, 30 may have amplitude (AM), frequency (FM) or phase (PM) modulations and may be with or without a carrier, for example signal f may be at baseband, audio, video, intermediate frequency (IF), radio frequency (RF), microwave or optical frequency, etc. A source such as an electron beam gun, carrier or local oscillator 40 may be used to beam scan means 10 and 30, to provide a carrier for signals in means 10, 20, 30, to up or downconvert signals in means 10, 20, 30, etc. Source 40 may be implemented inside or outside means 10, 20, 30. For example, source 40 may be electrically connected to means 10 or may be used to illuminate means 10 in the manner of a CRT or in the manner laser light 4 illuminates input transparency 1 of lens 2 in FIG. 1. Thus, while signals f, F are electrical, signals in means 10, 20, 30 may converted to acoustical, electrical, electromagnetic, AM, FM or PM, as desired.

The spectrum analyzer of FIG. 2 can be implemented on a single chip, for example following the procedure in the article by D. Anderson "Integrated Spectrum Analyzer" appearing in the IEEE Spectrum December 1978, except replacing the optical system therein (corresponds to FIG. 1) with an electronic system (corresponds to FIG. 2). Thus, source 40 may be used to launch a light wave in the direction of means 10 in the form of a surface wave device (SAW) with optical taps at locations $x_{1N}$. Means 20 in the form of optical paths or fibers connect paths DN between means 10 and means 30 in the form of optical adders (CCDs). In operation, light waves from source 40 interact with acoustic waves in means 10 to produce light waves which propagate in delay paths DN which terminate in means 30 each element of which vectorially adds the total light impinging at its location. Means 10, 20, 30 may be under common clock control so that a sample(s) of signal F appears at the output of means 20 for each sample(s) of signal f input to means 10.

From the foregoing it will be understood that the terms storage and storing are used both narrowly to indicate the physical storage of signals in means 10, 20, 30 and broadly to indicate the controlling of signals in means 10, 20, 30, for example such control operations as switching, modulating, demodulating, frequency conversion of signals in elements $x_{1N}$, $x_{2N}$ and DN. And, the terms samples and words are used interchangeably to indicate the analog or digital parts of signals used at the specific locations of means 10, 20, 30. And, whichever is the selection of devices for means 10, 20, 30, 40 in FIG. 2 these are always the direct electrical analogs of means 1, 2, 3, 4 in FIG. 1. Thus, means 10 is the equivalent of input focal plane 1, means 20 is the equivalent of lens 2, means 30 is the equivalent of output focal plane 3, and source 40 is the equivalent of source 4, with signal f representing the input transparency and signal F representing the output function.

Figure 3:
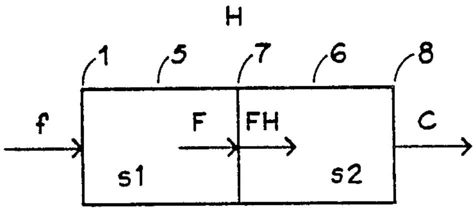
FIG. 3 is a prior art optical C system.

Referring to FIG. 3 is shown a prior art C system. Two identical FT systems s1 5 and s2 6, both identical to the system of FIG. 1, are separated by a transparency H at 7. If a transparency f is inserted at input 1 it will produce the FT signal F at 7 which combines with the transparency H to produce the product signal FH at 7 and the convolution C at the output 8, as is well known in the optical signal processing art.

Figure 4:
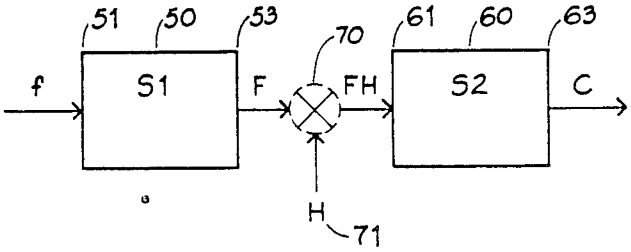
FIG. 4 is another C system according to the invention.

Referring to FIG. 4 is shown another C system according to the invention. Two identical FT systems S1 50 and S2 60 both identical to the system of FIG. 2 are separated by a multiplier 70. If a signal f is inserted at input 51, it will produce the FT signal F at 53 which combines with signal H at 71 to produce the product signal FH at 61 and the convolution signal C at 63. Multiplier 70 may be a single multiplier (as shown) for connecting the N channels between systems S1 50 and S2 60 in time multiplex or, multiplier 70 may comprise N multipliers in parallel. For example, multiplier 70 may be an array of non-linear elements, mixers or diodes, where signal F is available at one frequency and signal H is available at a second frequency. In this case, the output signal FH becomes available at the sum and difference of frequencies either one of which can be used to process signal FH in system S2 60.

From the foregoing it will be appreciated that the invention implements apparatus which simulates a diffraction lens, optical Fourier transformer and convolver. However, while the invention has been disclosed for the FT and C, it will be understood its application extends to any mathematical expression (corresponding to (1)) which can be computed by a diffraction lens or system of lenses. Particularly, it will be appreciated that while the prior art system of FIG. 1 uses diffracting paths dN and a diffraction lens 2, the invention system of FIG. 2 uses non-diffracting paths DN and a non-diffracting means 20 to obtain the same plus added results.

In many applications, it is desirable to compute the FT and C. Such applications might require matched filtering for echo ranging or for coherent communications systems, cross-correlation for interferometric analysis or for signal identification, spectrum analysis for passive detection, classification and pattern recognition, and general linear transformations on data vectors. Matched filters and correlators are special convolvers which perform operations at rates in excess of the capabilities of large gp computers. Their applications include and are well suited for the detection of signals (matched filters), the correlation of signals (correlation), and the spectrum analysis of signals (Fourier analysis). Options for the implementation of Fourier transformers and convolvers include both optical and electronic (gp and sp computer) means, their full potential being limited by the technical efficiency and economic availability of practical hardware. Electronic means in particular offer outstanding practical implementations in certain applications and have found use in such sophisticated signal processing tasks as bit synchronization, bit detection, error correction, coding, pulse compression, synthetic aperture processing and other applications. Optical means offer outstanding practical implementatons in applications where 2-D and speed are important. The system of the present invention is expected to make dramatic reductions in the speed, complexity and cost of electronic systems while at the same time adding significant 2-D capability to these systems and thereby for detecting 1-D and 2-D signals in noise with substantial reduction in the amount of computer power in applications involving radar, sonar and communications systems.

Although several particular configurations of an electronic lens, Fourier transformer and convolver have been described, the invention should not be considered to be limited by the particular embodiments of the invention shown by way of illustration but rather by the appendant claims.

I claim:

1. A divider or multiplier including:

first means for coupling a signal as input to a transmission line; and second means for coupling a signal as output from said transmission line, said transmission line being a passive line originating in said first means and terminating in said second means and having as principle parameter a length of line and having other parameters including the cross-section area of line, characteristic impedance, propagation constant, wavelength, frequency and propagation speed and having input signal f and providing output signal $fg^{-1}$ or fg where g is a function determined by said parameters of said transmission line, said second means providing as output said division $fg^{-1}$ or product fg.

2. The divider or multiplier of claim 1 where g is an exponential function.

3. A divider or multiplier as defined in claim 1 wherein at least one of said first and second means and said transmission line includes one of an electrical, electromagnetic, sonic means, optical fiber, surface acoustic wave device, multiplexer, an analog, or a digital device.

4. A divider or multiplier as defined in claim 1 wherein at least one of said first and second means includes one of a shift register, charge coupled device, transmitter, receiver, transducer, one-dimensional array of elements, two-dimensional array of elements, light emitting diode, photoelement, photoconductor, heterodyning means, or cathode ray tube means.

5. A divider or multiplier as defined in claim 1 wherein said first means includes one of an array antenna, a serial-in parallel-out means, or a parallel-in parallel-out means.

6. A divider or multiplier as defined in claim 1 wherein said second means includes one of an AND gate, adder, parallel-in serial-out means, or parallel-in parallel-out means.

7. A divider or multiplier as defined in claim 1 wherein said transmission line includes one of a voltage reference plane, a printed circuit board, a monolithic semiconductor, an integrated circuit, or an electron beam path.

8. A divider or multiplier as defined in claim 1 wherein said transmission line includes an active element.

9. A divider or multiplier as defined in claim 1 wherein g is a fixed function determined by said transmission line.

10. A divider or multiplier as defined in claim 1 wherein g is a variable function determined by said transmission line.

11. A divider or multiplier as defined in claim 1 wherein said second means includes means having as input said division $fg^{-1}$ or said product fg and providing as output the integral of $fg^{-1}$ or fg.

12. A method of dividing or multiplying including the steps of:

coupling a signal as input to a transmission line;

coupling a signal as output from said transmission line;

providing said transmission line as a passive line originating in a first coupling means and terminating in a second coupling means and having as principle parameter a length of line and having other parameters including the cross-section area of line, characteristic impedance, propagation constant, wavelength, frequency and propagation speed;

inputting signal f and outputting signal $fg^{-1}$ or fg from said transmission line where g is a function determined by said parameters of said transmission line; and providing as output from said transmission line said division $fg^{-1}$ or product fg.

13. The method of claim 12 including the step of providing g as an exponential function.

* * * * *